United States Patent

[11] 3,594,621

[72] Inventor Helmut Stechmann
 Schwenningen Am Neckar, Germany
[21] Appl. No. 879,023
[22] Filed Nov. 24, 1969
[45] Patented July 20, 1971
[73] Assignee Kienzle Uhrenfabriken G.m.b.H.
 Schwenningen am Neckar, Germany
[32] Priority Nov. 23, 1968
[33] Germany
[31] P 18 10 523.2

[54] CONTROL SYSTEM FOR OSCILLATORY MOVEMENTS
 8 Claims, 4 Drawing Figs.
[52] U.S. Cl. .................................................... 318/128,
 318/132, 58/23
[51] Int. Cl. .................................................... H02k 33/02

[50] Field of Search .................................................... 310/36-
 -39; 318/124—133; 331/116; 58/23, 23 A, 28

[56] References Cited
 UNITED STATES PATENTS
 3,176,171 3/1965 Baumgartner................ 318/128 X Primary Examiner—D. F. Duggan
Attorney—Leon M. Strauss ABSTRACT: The invention concerns a device for adjusting or controlling the oscillation amplitude of a directly driven mechanical oscillating system which is equipped with at least one permanent magnet, which performs oscillations over a control coil, producing therein an induction voltage, which effects over an electronic circuit flow in an operating coil whose magnetic field has a drive effect on the oscillating system, the electronic circuit as a control circuit regulating the current flow in dependence on the induced voltage, so that the oscillation amplitude remains constant.

PATENTED JUL 20 1971　　　　　　　3,594,621

INVENTOR:
HELMUT STECHMANN

CONTROL SYSTEM FOR OSCILLATORY MOVEMENTS

BACKGROUND OF THE INVENTION

In a balance wheel oscillating system with two supporting plates, on each of which is arranged in opposed relation a permanent magnet, it is known to adjust the coil system, consisting of the control coil and the operating or working coil, in the air gap between the magnets. The adjustment is effected approximately parallel to the magnetic lines. The problem which exists in such control system, is to adjust the coil system exactly in the center of the air gap to prevent dragging or skimming of one of the permanent magnets on the coil system. The density of the magnetic flux or field is constant in the air gap due to the employment of two permanent magnets.

It is furthermore known in a coil and magnet system of the aforesaid type to shift the coil system perpendicularly to the magnetic field lines. This has the effect, on the one hand, that the control coil is traversed by more or fewer magnetic lines, and that furthermore the electromechanical efficiency between the working coil and the permanent magnets is generally diminished or minimized. It is thus possible to adjust the amplitude of the oscillating system, however the electronic circuit used in such system must be laid out as a pure amplifier circuit, since an adjustment of the amplitude is only possible in this manner. The electronic circuit cannot be designed as a control circuit for keeping the amplitude of the oscillating system constant, when the voltage induced in the control coil regulates the current flow through the operating coil. If the coil system consisting of an operating coil and a control coil, were shifted or regulated in the above described manner within such an electronic amplitude-regulating circuit, both the induced voltage as an actual value, and the electromechanical efficiency, that is, the characteristic of the transformer would be varied in the control circuit.

If the coil system consisting of operating or working coil and control coil is so regulated, for example, that the coils protrude to a lesser degree into the air gap between the permanent magnets, the voltage induced in the control coil diminishes. This induced voltage, however, is for the electronic amplitude-regulating circuit the measure for the amplitude of the mechanical oscillating system (actual value), so that a reduction of the induced voltage due to shifting of the coil system would effectuate an increase of the current flow through the working coil (corresponding to the regulating step in a reduction of the amplitude).

At the same time, however, due to shifting of the coil system the electromechanical efficiency between working coil and magnetic system has been reduced, which compensates the effect of the increased current flow through the working coil. The increased current flow through the working coil and a lower efficiency between working coil and magnetic system yield an amplitude of the oscillating system, as it existed before the shifting of the coil system, but with the difference that more load current is required to achieve the same amplitude.

In the series production of systems of the above mentioned type different oscillation amplitudes are obtained at constant battery voltage from one oscillating system to the other, which are due to leakages and differences in the geometry.

SUMMARY OF THE INVENTION

The object of the present invention is to permit the adjustment of the amplitude even in oscillating systems provided with an electronic circuit which is designed as a control circuit for the amplitude of the oscillating system. This is achieved according to the invention in a manner that only the control coil is arranged at a predetermined distance from the permanent magnet for adjustment in the flow direction of the magnetic flux passing through the control coil.

It is therefore one of the objects of the present invention to provide means facilitating regulatory measures in respect of the oscillatory movements of a balance wheel or the like at a minimum effort and at high efficiency.

It is another object of the invention to provide means contributing to a greatly simplified adjustment system for equalizing oscillations of mechanically driven instrumentalities through electronic circuit means.

Still another object of the invention resides in the creation of a very compact and sensitive regulating system for controlling the amplitude of an instrument carrying out oscillatory movements, the system necessitating only a few parts which are easily accessible to an operator and requiring almost very little surveillance.

Yet a further object of the invention is to provide means conducive to an efficacious operating technique for controlling time-keeping accuracy in a manner comparable to that used in a tuning-fork watch and like measuring instruments.

These and other objects and advantages of the invention ensue from the following detailed description, which has reference to the attached drawings, the latter being exemplary and explanatory of the principles of the invention and being in no way restrictive thereof.

BRIEF DESCRIPTION OF THE DRAWINGS

The invention is more schematically represented by way of example in the accompanying drawings, which illustrate a preferred embodiment of the invention.

In the drawings.

Figure 1:
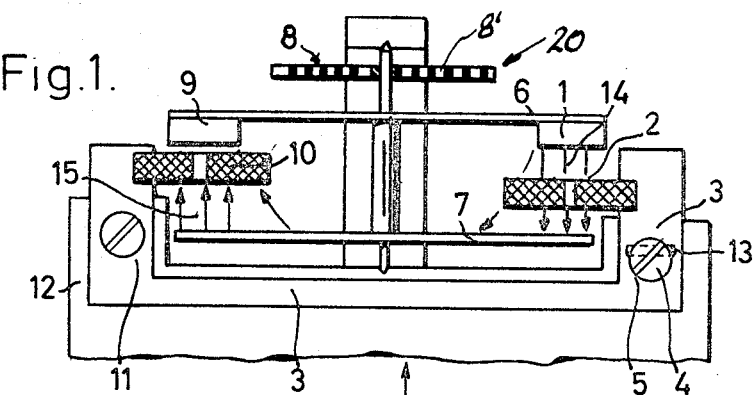
FIG. 1 is a side elevation (seen diagrammatically) of a regulating apparatus pursuant to the invention.

Referring now more specifically to the drawings there is disclosed in FIG. 1 an apparatus 20 which consists of a balance wheel 8 equipped with a mechanical spiral spring 8' and a first upper soft magnetic support plate or disc 6. This plate carries on its circumference and staggered by 180° to each other a first permanent magnet piece 1 and a second permanent magnet piece 9 having each approximately equal diameter (see FIGS. 1 and 3). There is further provided and connected in any suitable manner to apparatus 20 a soft magnetic return plate 7. In the air gap between the permanent magnet 9 and the magnetic return plate 7 there is arranged a working or operating coil 10. This coil 10 is secured on an arm 3a of a swingable support 3. In the air gap between the permanent magnet 1 and the magnetic return plate 7 there is arranged a control coil 2, which is likewise secured to said support 3, as shown. The position of coil 2 in the air gap between the permanent magnet 1 and the magnetic return plate 7 is determined by the position of the adjustment screw 4 provided with an eccentric 5. By turning the screw 4, control coil 2 can be shifted relative to the permanent magnet 1. To this end the eccentric pin 5 abuts the case of a clock, watch or like apparatus (not shown), on which the support 3 is secured. The fulcrum of the support or carrier 3 during occurrence of the adjustment via adjustment screw and eccentric 4, 5 is located near working coil 10 and is formed by a screw 11.

This apparatus pursuant to the invention ensures that the control coil 2 is displaced during the operation of the eccentric arrangement 4—5, but not the working coil 10. During the adjustment operation the induced control voltage varies thus in the coil 2, but not the electromagnetic efficiency between coil 10 and permanent magnet 9. For example, if coil 2 approaches the permanent magnet 1 (FIG. 2), this results initially in an increase of the induced control voltage, which is the same for the electronic control circuit, as if the amplitude of the balance wheel had increased. In the control circuit this results in a reduction of the current through the working coil 10 so that the amplitude of the balance wheel finally decreases by the aforesaid shifting of coil 2.

Figure 2:
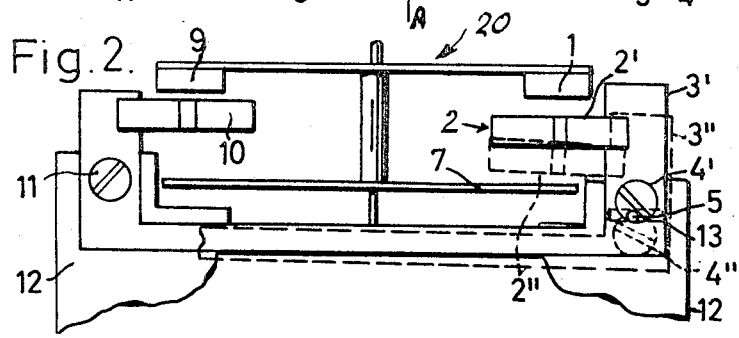
FIG. 2 is a side view similar to that of FIG. 1, but indicating respectively in broken and full lines changed positions of effective parts of the apparatus, to which reference is made in the specification.
Figure 3:
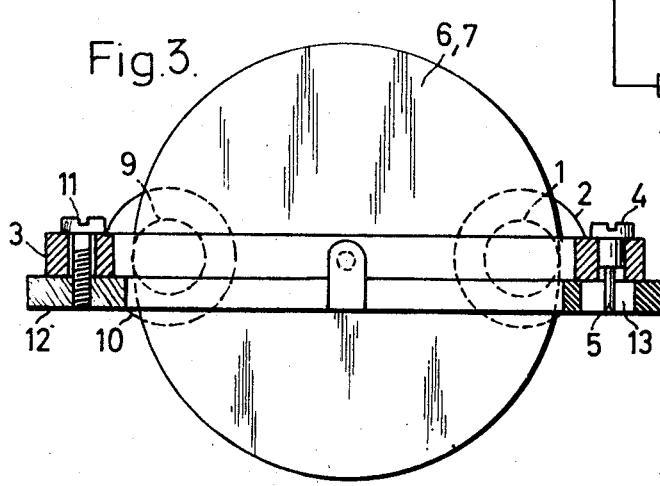
FIG. 3 is a bottom plan view as seen in the direction of arrow A of FIG. 1.

Reverting to FIGS. 1 to 3 the position of coil 2 in the abovementioned air gap may be varied by rotation of screw 4. The support 3 pivotably secured to the watch frame 12 through screw 11 is displaceable by means of adjusting screw 4 having an eccentric pin 5, which is located in a slot 13 of the watch frame 12.

If coil 2 assumes a position in the air gap between magnet 1 and flux return plate 7 (see FIG. 1) and if in this position the balance wheel amplitude were too large, then screw 4 is rotated until a respective position 4' of screw 4, of coil 2 at 2' and support 3 at 3' is taken up as indicated in FIG. 2.

By this measure, at initially unchanged excessive amplitude, the induced control voltage in control coil 2' is increased, since in the vicinity of permanent magnet 1 the density of the magnetic field 14 is great due to the stray flux of this magnetic field. An increased control voltage, however, brings about, as a result of the electronic control circuit (FIG. 4) that the current through coil 10 is reduced. Coil 10 does not vary its position in the magnetic field 15 to any appreciable extent, so that because of the reduced current through the working coil 10 the amplitude of the balance wheel 8 is decreased, i.e. reduced to a desired predetermined degree.

If at a position according to FIG. 1, the balance wheel amplitude is too small, screw 4 will be adjusted so that coil 2 moves away a certain distance from magnet 1. This position is shown in broken lines in FIG. 2, corresponding to the position of coil 2'', screw 4'', and support 3''. The induced control voltage in coil 2'' thus decreased by this measure, brings about, as a result of the electronic control circuit, an increase of the working current through coil 10, so that the amplitude of the balance wheel increases.

In FIG. 3 there is shown that the return flux plates 6 and 7 may be designed as discs and the permanent magnets 1 and 9 are represented by small discs. Alternatively, however, plates 6 and 7 may be replaced by beams whose widths correspond to the diameter of magnets 1 and 9.

Figure 4:
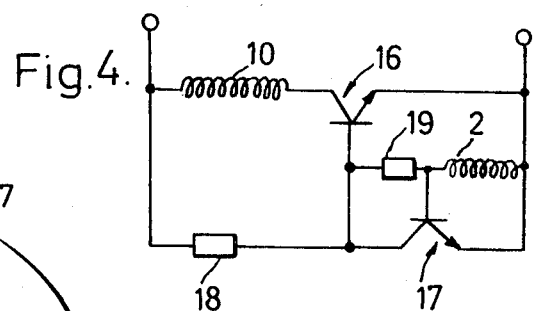
FIG. 4 indicates an electronic control circuit employable in carrying out the invention.

In FIG. 4 there is given and shown an example of an electronic control circuit employable in the invention. Transistor 16 is the working transistor, and transistor 17 is the control transistor, which are both controlled by the control coil 2. The resistances 18 and 19 determine the working points of the transistors.

If in coil 2 a control voltage is induced, transistor 17 opens more or less as a function of the magnitude of the control voltage. The emitter-collector distance in transistor 17 thus constitutes a variable resistance dependent on the magnitude of the control voltage. Since this manifests itself in a variation of the base voltage of transistor 16, i.e. the working point thereof is varied as a function of the control voltage, transistor 16 is opened less at a high-control voltage than at a low-control voltage. The result of this fact is that at high-control voltage the current through the working coil 10 is lower than at a low-control voltage.

It can thus be seen that there has been provided in accordance with the invention a novel control system for oscillatory movements, in particular for use in connection with mechanically driven balance wheels of watches, clocks and like instruments, which is characterized by certain mechanical features incorporated in an apparatus, which actuates via control coil and operating coil an electronic control circuit for maintaining the amplitude of the oscillatory movements substantially constant, but allows in very efficacious and simplified manner any desirable regulation or adjustment, which the practice may require.

It is to be noted that the invention in its broader aspects is not limited to the specific embodiment herein shown and described, but departures may be made therefrom within the scope of the accompanying claims without deviating from the principles of this invention and without sacrificing its advantages:

What I claim is:

1. In an oscillating system for use in connection with a mechanically operated spiral spring-equipped balance wheel of a timepiece and like instrument; comprising in combination, a support having a fulcrum at one end and a setscrew at the other end, means operatively connected with said setscrew to displace said other end of said support about said fulcrum, a first magnetic return member, a second magnetic return member, both said magnetic return members being operatively connected with said balance wheel and being arranged in superposed position to each other, a first coil forming a control element, a second coil constituting an operating element, both said coils being carried by said support adjacent the respective ends of the latter, a first permanent magnet mounted on said first member, a second permanent magnet joined to said first member and arranged in staggered relation about 180° to the location of said first permanent magnet, said first permanent magnet facing said control element, said second permanent magnet being located opposite said operating element and establishing respective magnetic fields between said first magnet, said control coil and said second return member on the one hand and between said second magnet, said operating coil and said second return member on the other hand, said operating coil and said second permanent magnet being so located with respect to each other that the distance therebetween remains substantially constant when said support is pivoted about its fulcrum by means of said setscrew while the distance of said control coil from said coordinated first permanent magnet is adjustable within the magnetic field established between the latter magnet and said second magnetic return member, and an electronic control circuit regulating the current flow in dependence on the induced voltage of said control coil to influence the magnetic field which passes through said operating coil thereby to maintain the amplitude of the oscillating system at constant rate.

2. In a system according to claim 1, said operating coil being disposed normally closer to its coordinated second permanent magnet than said control coil with respect to the corresponding first permanent magnet.

3. In a system according to claim 1, including a fixed wall on which said fulcrum is anchored, said wall being provided with a guide slot adjacent said setscrew, and an eccentric pin forming part of said setscrew and displaceable within said slot upon operating said setscrew for adjustment purposes.

4. In a system according to claim 1, wherein the diameter of said coils is about twice the diameter of their corresponding permanent magnets.

5. In apparatus for regulating the oscillation amplitude of a mechanical oscillating system having a first permanent magnet which oscillates over a control coil and produces therein an induction voltage, which effects over an electronic circuit in a working coil a current flow whose magnetic field influences the oscillating system, said working coil being associated with a second permanent magnet of the oscillating system, the electronic circuit as a control circuit regulating the current flow in dependence on the induced voltage so that the amplitude remains constant; characterized in that the control coil is constructed to change its position with respect to its air gap a predetermined distance from its coordinated first permanent magnet for acting on the direction of the magnetic flux passing between the control coil and its corresponding first permanent magnet, the distance between the working coil and its corresponding second permanent magnet remaining substantially constant.

6. An apparatus according to claim 5, having a first magnetic return plate made of soft iron, which determines between it and the permanent magnet the air gap for the control coil; characterized in that the control coil extends into said air gap and is displaceable thereto in the direction of the magnetic field established between the coordinated permanent magnet and said first magnetic return plate.

7. An apparatus according to claim 5, equipped with a further permanent magnet which is associated with the working coil, which is arranged with said control coil on the same support; characterized by an adjustable eccentric arranged adjacent the control coil and extending between the support and a wall, while the fulcrum of the support is located at the level and in the vicinity of the working coil.

8. In a mechanical oscillating system equipped with means for producing an induction voltage, which effects over an electronic circuit a current flow whose magnetic field influences the oscillating system, so that its amplitude remains substantially constant; the combination of a support having at one end a fulcrum, and adjustment means at its opposite end, a first coil located near said fulcrum, a second coil positioned near said adjustment means, and magnets respectively coordinated to said first and second coil in order to regulate the magnetic flux between said magnets and said second and said first coils in dependence on the position of said adjustment means through which said second coil is movable to and from its coordinated magnet.